United States Patent
Luffman et al.

(10) Patent No.: US 8,897,713 B2
(45) Date of Patent: Nov. 25, 2014

(54) SYSTEM, METHOD, AND COMPUTER PROGRAM PRODUCT FOR WIRELESS NETWORK MONITORING

(75) Inventors: Douglas E. Luffman, Webster, NY (US); Fred F. Moore, III, Victor, NY (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1299 days.

(21) Appl. No.: 11/080,331

(22) Filed: Mar. 15, 2005

(65) Prior Publication Data

US 2006/0211414 A1 Sep. 21, 2006

(51) Int. Cl.
| | | |
|---|---|---|
| H04B 17/00 | (2006.01) | |
| H04W 24/00 | (2009.01) | |
| G06F 15/173 | (2006.01) | |
| G06F 15/177 | (2006.01) | |
| G06F 11/00 | (2006.01) | |
| H04L 12/26 | (2006.01) | |
| H04W 24/04 | (2009.01) | |
| G07C 3/00 | (2006.01) | |
| H04L 12/24 | (2006.01) | |

(52) U.S. Cl.
CPC ............ H04L 41/069 (2013.01); *H04L 41/22* (2013.01); H04L 43/0811 (2013.01); H04L 41/06 (2013.01); *H04L 43/0817* (2013.01); H04W 24/04 (2013.01); *G07C 3/00* (2013.01)
USPC ....... 455/67.11; 455/423; 455/424; 455/63.1; 455/67.13; 709/223; 709/224; 715/734; 715/736; 715/737; 714/4.1; 714/25; 714/100

(58) Field of Classification Search
USPC .............. 455/423, 67.11, 424, 63.1, 67.13; 714/25, 37, 40, 4, 4.1, 100; 709/223, 709/224; 715/734–737
See application file for complete search history.

(56) References Cited

U.S. PATENT DOCUMENTS

| | | | |
|---|---|---|---|
| 5,285,494 A | * | 2/1994 | Sprecher et al. .............. 455/423 |
| 5,870,667 A | * | 2/1999 | Globuschutz ................ 455/419 |
| 6,553,336 B1 | | 4/2003 | Johnson et al. |
| 6,557,122 B1 | * | 4/2003 | Sugauchi et al. .............. 714/57 |
| 6,591,296 B1 | * | 7/2003 | Ghanime ...................... 709/224 |
| 7,451,098 B2 | * | 11/2008 | Ingman et al. .................... 705/9 |
| 2004/0023635 A1 | * | 2/2004 | Impson et al. ............. 455/404.1 |
| 2004/0111313 A1 | * | 6/2004 | Ingman et al. .................... 705/9 |
| 2004/0122618 A1 | | 6/2004 | Suzuki et al. |
| 2004/0203440 A1 | * | 10/2004 | Katz ......................... 455/67.11 |

FOREIGN PATENT DOCUMENTS

EP   EP 0 599 606 A   6/1994

OTHER PUBLICATIONS

Notification Concerning Transmittal of International Preliminary Report on Patentability dated Sep. 27, 2007 in PCT Application No. PCT/US2006/002753.

* cited by examiner

*Primary Examiner* — Wesley Kim (57) ABSTRACT

A system, method, and computer program product for wireless network monitoring. Some particular features of various embodiments include notification via mobile phones (or other wireless devices) of outages in the wireless environment, an automated incident log, a web page to enter the resolution of an outage, a contact list containing personnel who could potential be contacted during an outage, and pop up messages that occur when an outage is detected.

15 Claims, 7 Drawing Sheets

SYSTEM, METHOD, AND COMPUTER PROGRAM PRODUCT FOR WIRELESS NETWORK MONITORING

TECHNICAL FIELD OF THE INVENTION

The present invention is directed, in general, to wireless system monitoring.

BACKGROUND OF THE INVENTION

A typical integrated system for wireless communications and information management is built across multiple platforms, such as a web server, a UNIX server, and a mainframe server system, and has many components such as a reverse proxy, local director, enterprise server, and other database and information systems. Known monitoring systems for these only provide limited status on operational status of the applications and systems.

As a result, any problems with the system are often difficult to locate and isolate, and finding the appropriate persons to perform any required maintenance is often difficult and time consuming.

There is, therefore, a need in the art for a system, method, and computer program product for wireless network monitoring.

SUMMARY OF THE INVENTION

A preferred embodiment provides a system, method, and computer program product for wireless network monitoring. Some particular features of various embodiments include notification via mobile phones (or other wireless devices) of outages in the wireless environment, an automated incident log, a web page to enter the resolution of an outage, a contact list containing personnel who could potential be contacted during an outage, and pop up messages that occur when an outage is detected.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Figure 1:
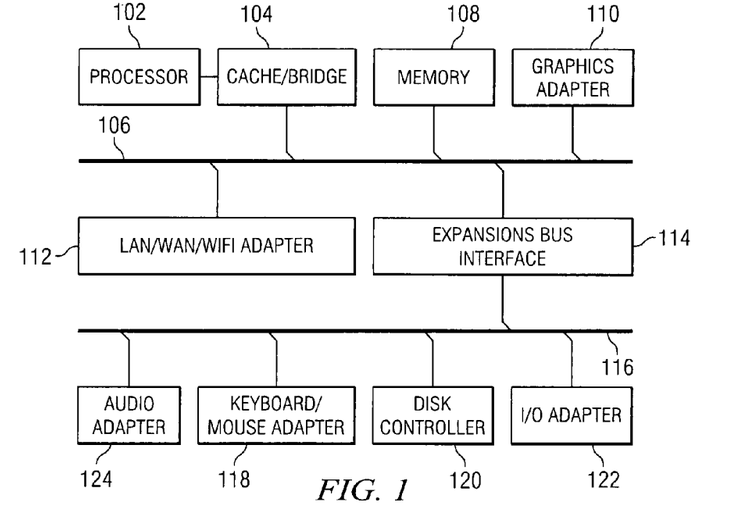
FIG. 1 depicts a block diagram of a data processing system in accordance with a preferred embodiment.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

A preferred embodiment provides a system, method, and computer program product for wireless network monitoring. Some particular features of various embodiments include notification via mobile phones (or other wireless devices) of outages in the wireless environment, an automated incident log, a web page to enter the resolution of an outage, a contact list containing personnel who could potential be contacted during an outage, and pop up messages that occur when an outage is detected.

The disclosed monitor is preferably used for monitoring and tracking problems related to wireless network hardware and software, including software processes that that abnormally terminate. The monitor sends a warning message to mobile phones or other wireless devices (or wired devices, if needed), and creates an entry in an incident log used for metrics. The monitor provides an visual diagram of status, problem, and resolution information When operational status is normal, lines between each component are green. When operational status is abnormal, a red line will appear. The incident log is updated with the time and date of the event or component suffering the failure. A blue line appears with a label that gives the group responsible for the component and their telephone number.

In various embodiments, two option buttons are provided, including one to display the incident log (web page), and the other to record the resolution. In a preferred embodiment, two contact lists are embedded within the monitoring tool, as illustrated in the figures. Check boxes are available to indicate when a server or application is scheduled to be down or disabled, which turns off the automatic notification and updating.

An additional feature in some embodiments of the monitor is to display concurrent users and bad sessions.

The preferred embodiments provide an automated process that notifies appropriate persons of potential problems. When an outage occurs, the monitor will display a red line of where the problem exists. When this happens, the monitor generates a notification to the designated recipient mobile phone or other wireless or wired device, typically via an electronic mail address. The information that is transmitted contains the group or person that is responsible for responding to the outage, this person or group's phone number, and what component was affected.

FIGS. 2-7 depict an exemplary screenshots of a system for monitoring a wireless network in accordance with various embodiments. It should be noted that, in these figures, the details of the various server systems, database systems, etc., are unnecessary for an understanding of the claimed inventions. As such, only those aspects of the screenshots as are helpful for an understanding of the various embodiments are described or called out; no description is included for those features that are not important for an understanding of the invention. It would also be noted that the various described and/or claimed features are not limited to monitoring wireless systems, but can be applied to other system for which real-time monitoring is advantageous.

Figure 2:
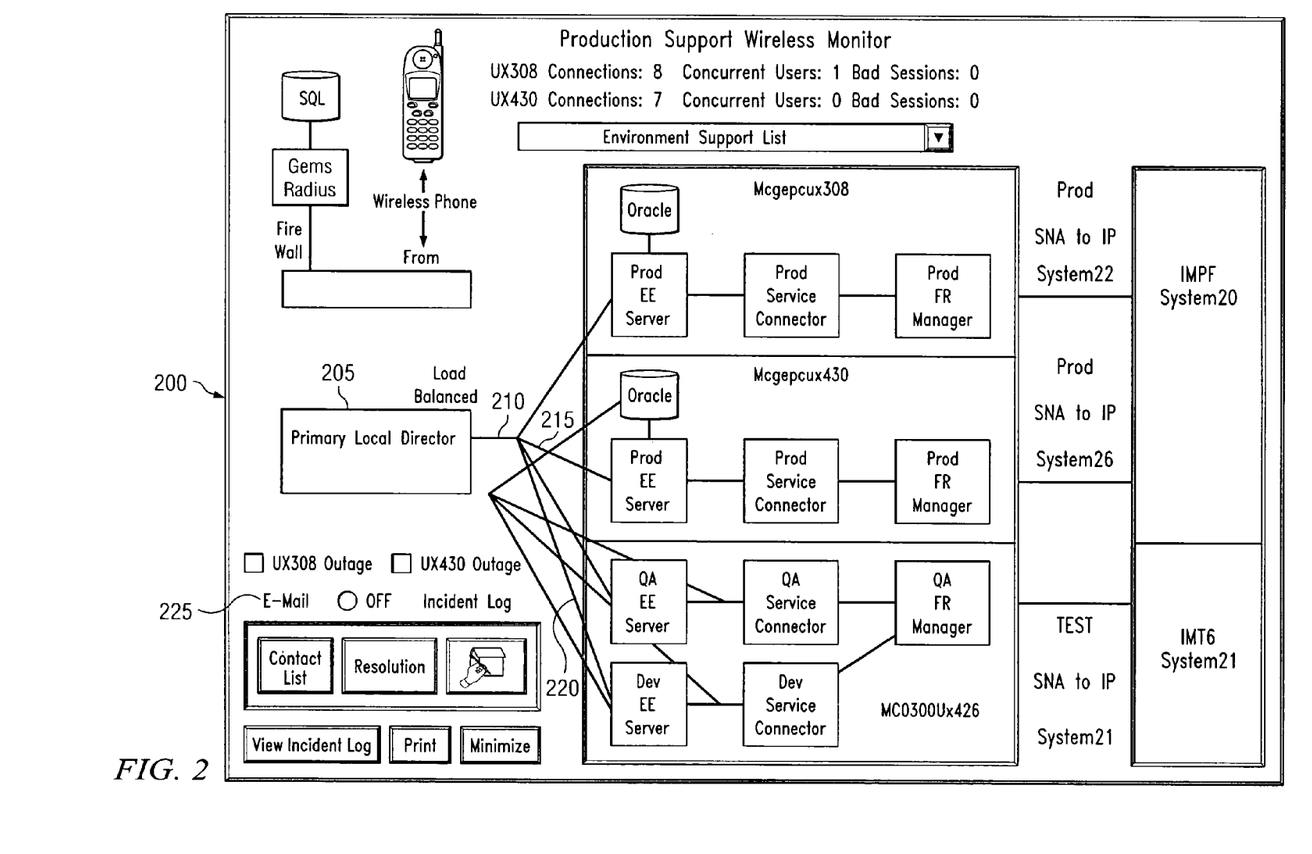
FIGS. 2-7 depict exemplary screenshots of a monitoring system in accordance with various embodiments.

In FIG. 2, screenshot 200 shows a director system 205 connected to communicate with various other systems, as shown. Links 210/215/220 show the current status of communications with each of the respective systems. In this figure, assume that 210 and 215 are shown in green, indicating that the links and their respective connected systems are functioning as intended. Link 220 is shown in red, indicating that the link or its connected system has failed. Preferably, each link between each system shown will be similarly displayed in a color that indicates the status of the link or connected system, allowing a user to immediately see the status of all connected systems, and to immediately identify any system problems.

When an outage occurs the monitor will display a red line of where the problem exists (of course, the actual color used can vary in each implementation). In some embodiments, when this happens, a routine runs inside the code that generates a notification to the designated recipient's mobile telephone or other wireless device, typically via their email address. The information that is transmitted contains the group that is responsible to respond to the outage, their phone number and what component was affected. In this way, as soon as the outage or failure occurs, a resolution process is started. The means of sending such a notification to a wireless device is known to those of skill in the art. Note that the email-notification can be disabled, as shown at 225 in FIG. 2.

Figure 3:
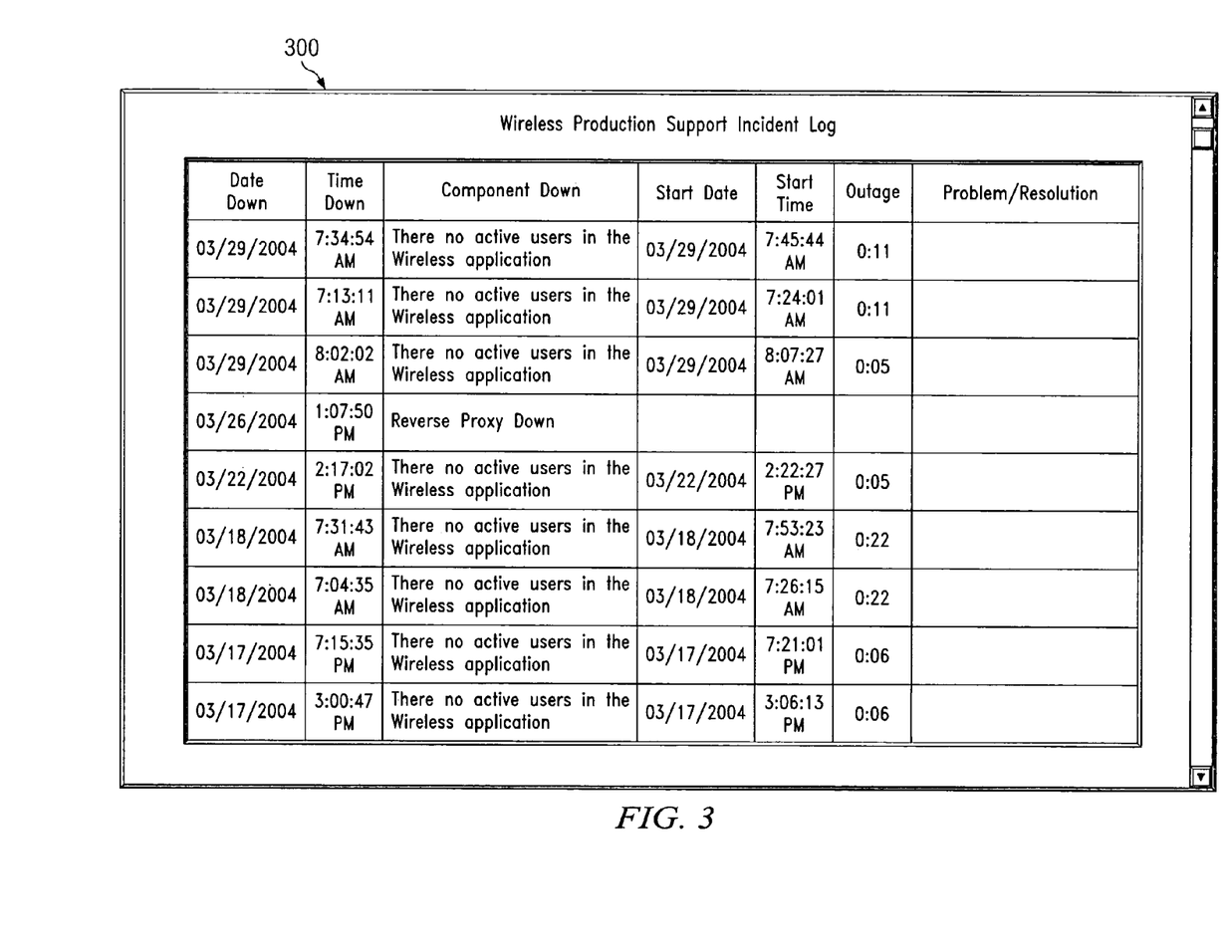

Another feature of a preferred embodiment is an automated incident log. FIG. 3 illustrates an exemplary screenshot 300 of an incident log in accordance with a disclosed embodiment. When an outage has been identified, the monitor will log several important pieces of information that is used for metric reporting. First, the date that the component failed is recorded, followed by the component identifier, the date and time the outage occurred, and the duration of the outage. Preferably, all the foregoing fields are automatically completed, and the only field that is manually entered is the resolution of the problem. In some embodiments, the incident log is a web page displayed within a client application, as shown in FIG. 3.

Figure 4:
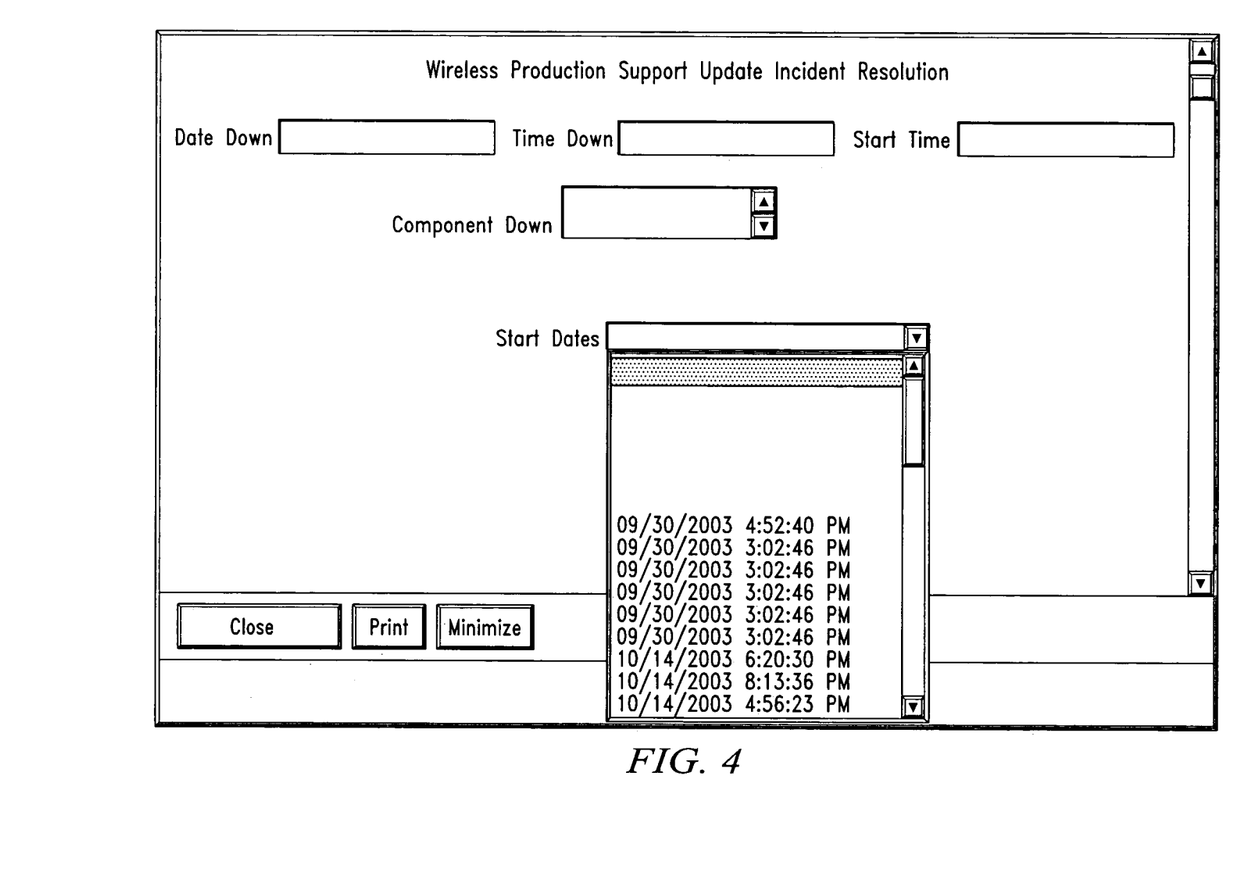
Figure 5:
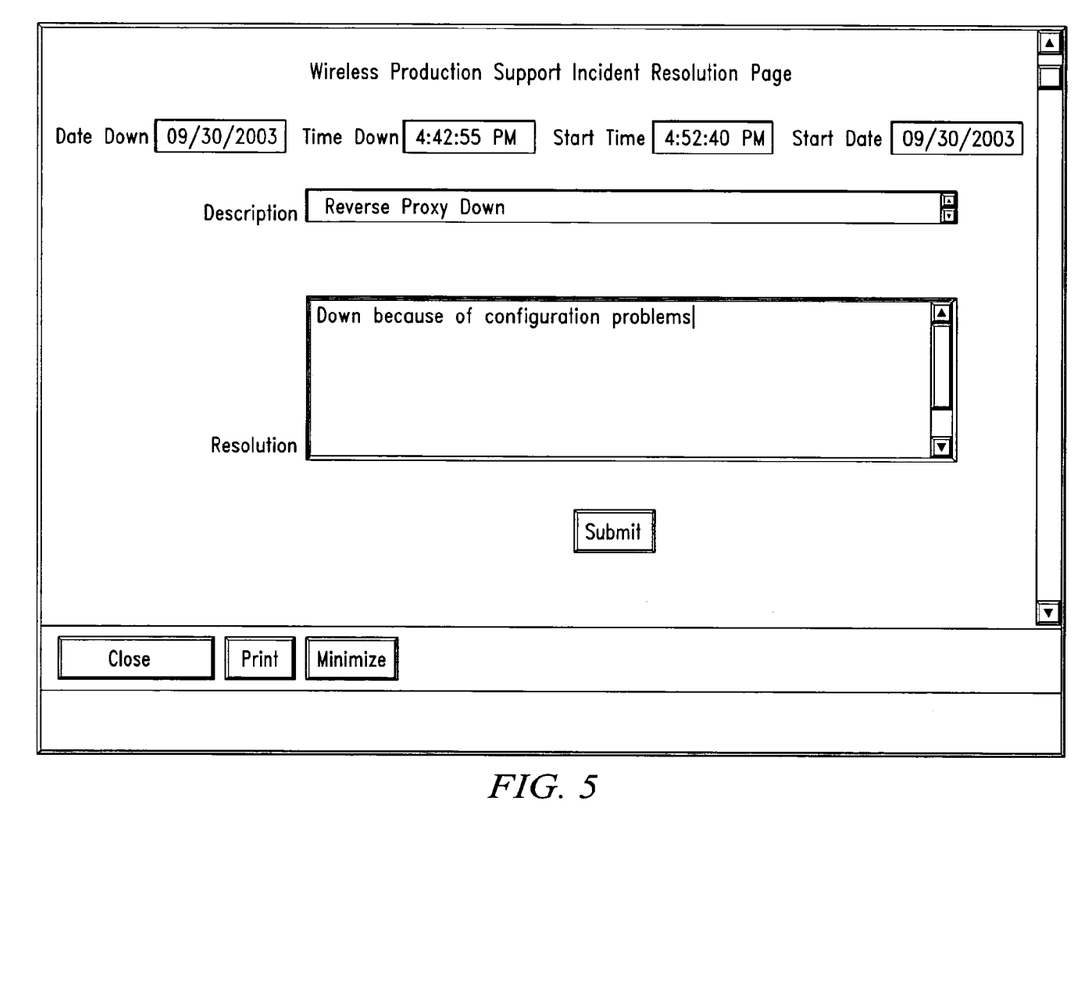

Another feature of various embodiments includes problem resolution displays. FIGS. 4 and 5 depict exemplary resolution displays in accordance with a preferred embodiment. FIG. 4 illustrates a web page that displays a drop down that contains dates of outages. When a user selects a date in a screen corresponding to FIG. 4, a screen in accordance with FIG. 5 is displayed that shows a second page which contains the Down Date, Down Time, Start Time that the component came up and the Start Date that it occurred on.

Figure 6:
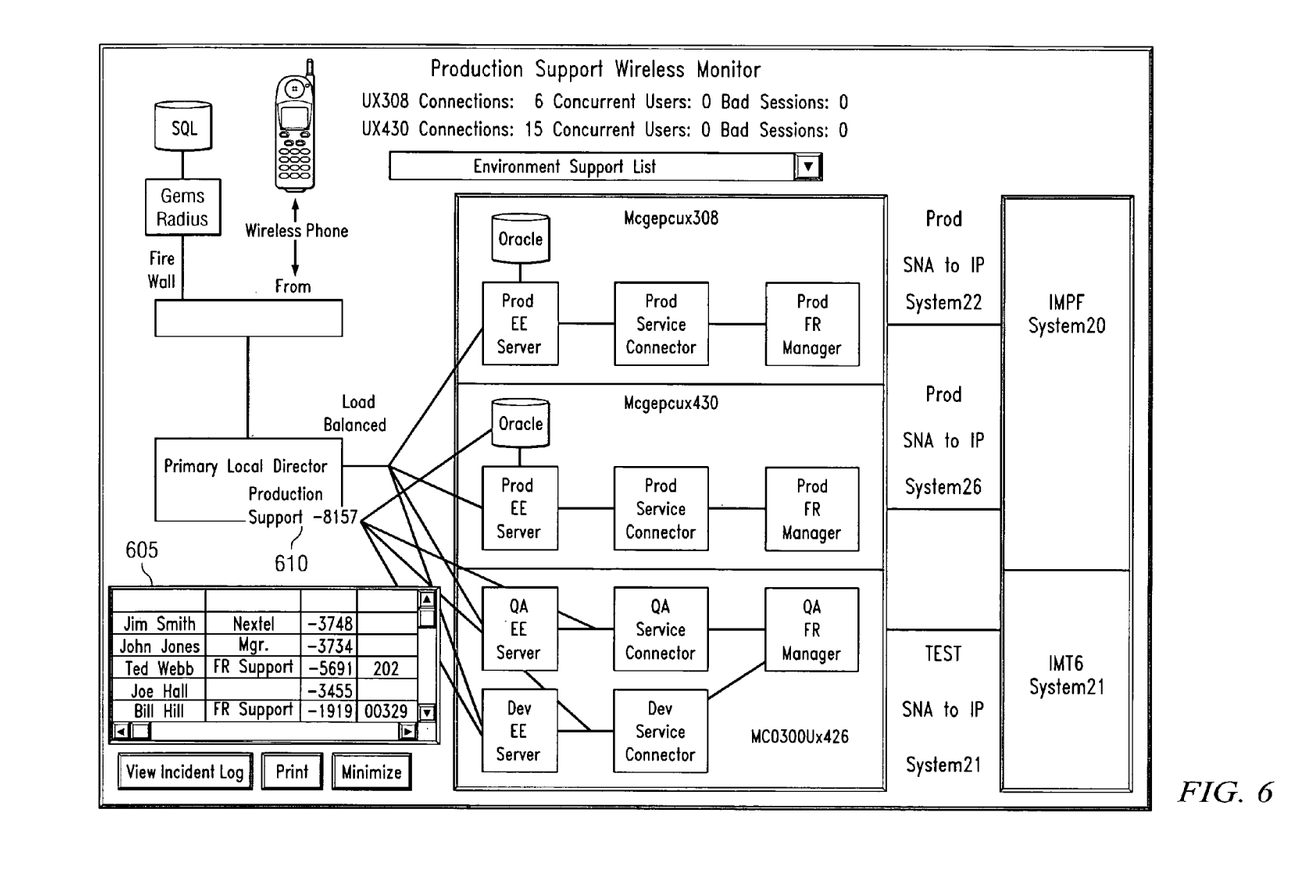

FIG. 6 depicts an exemplary screenshot, in accordance with various embodiments, illustrating other features. Another feature of various embodiments is a contact list 605 containing personnel who could potentially be contacted during an outage. This feature enables the personnel that monitor these outages to be able to bring up a list of contacts on demand have the potential of resolving a problem quicker.

Another feature of various embodiments are pop-up messages that occur when an outage is detected. FIG. 6 shows one of those messages 610 that pop up when an outage takes place. This provides for a quicker resolution of a problem when the information about who is responsible is displayed automatically along with the phone number to call. In certain embodiments, a blue line is used to point from the failed system to the corresponding pop-up.

Figure 7:
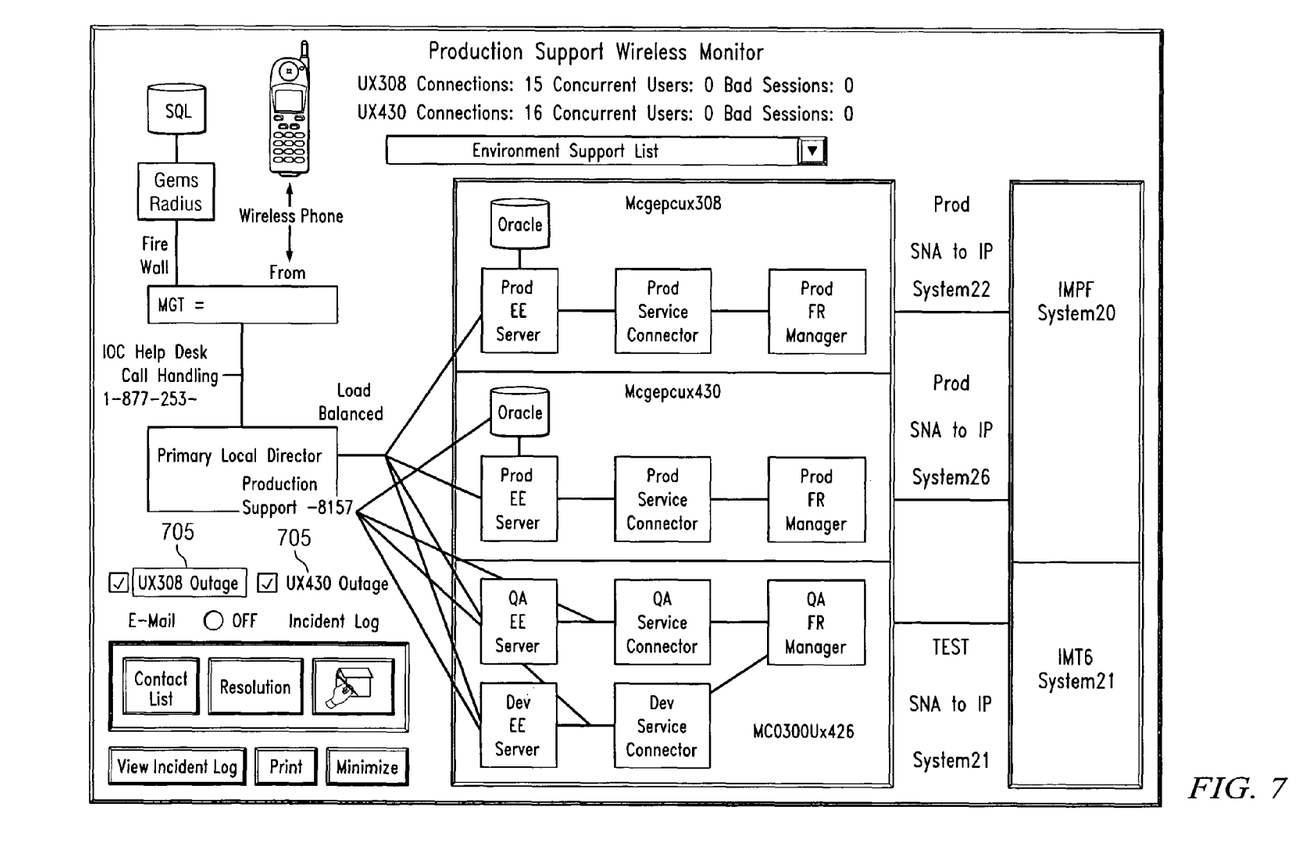

The screenshot of FIG. 7 illustrates another feature of various embodiments. Here, checkboxes 705 are used to disable automatic notifications and incident logging for scheduled outages. If an outage of a specific system is scheduled, a corresponding box is checked. Thereafter, when the system detects the outage, the system will preferably not send an outage notification or automatically log the incident. In an alternate embodiment, the outage incident is logged, but the log entry indicates that the outage was scheduled.

Figure 8:
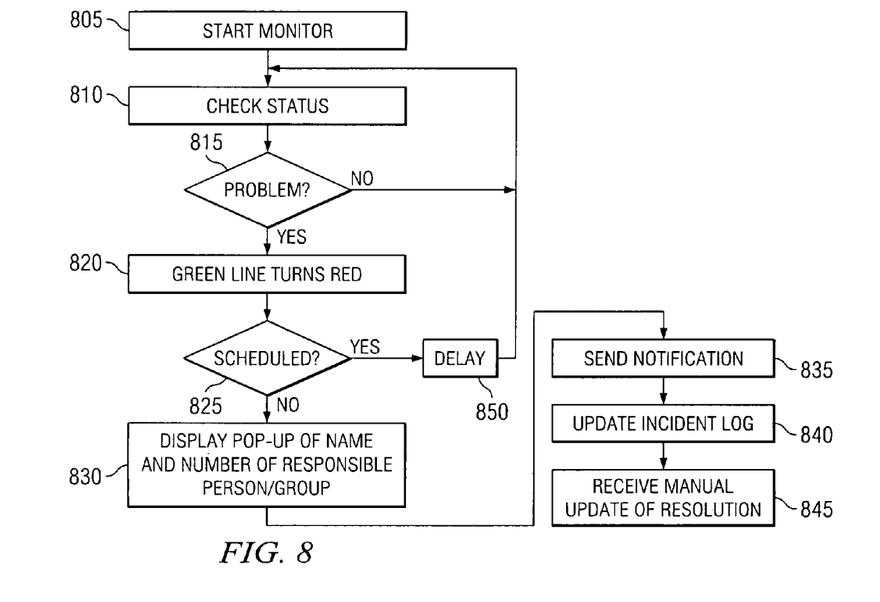
FIG. 8 depicts a flowchart of a process in accordance with a preferred embodiment

FIG. 8 depicts a flowchart of a process in accordance with a preferred embodiment. First, the monitor is started (step 805). Next, the status of all relevant components, including systems, databases, and/or links, is checked (step 810). If there is no problem detected (step 815), the system will delay (step 850), typically, for one minute, then the status is checked again (returning to step 810).

If a problem or outage is detected (step 815), the display will graphically indicated the problem component (step 820) preferably by turning a green status-indicator line to red.

Next the system determines if the outage or problem was scheduled (step 825). If so, then the system will delay (step 850), typically, for one minute, then the status is checked again (returning to step 810).

If the outage was not scheduled (step 825), then the system will display a pop-up of the name and contact number of the person or group responsible for responding to an outage of the particular component (step 830). The system will then send an outage notification to an appropriate wireless device, such as a mobile telephone or alphanumeric pager, preferably using the device's email address (step 835).

The system will then automatically update the incident log (step 840), preferably including the date that the component failed, the component identifier, the date and time the outage occurred, and the duration of the outage. Finally, the system will receive a manual update with the resolution of the outage (step 845).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of medium utilized to actually carry out the distribution. Examples of machine usable or machine-readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for automated monitoring of a system, comprising:
    checking the status of multiple system components, using a data processing system;
    displaying a visual indicator of a component failure;
    determining whether the failure was scheduled or not; and
    responsive to determining that the failure was not scheduled,
        displaying contact information for at least one person responsible for responding to the failure;
        sending basic information corresponding to the component failure to a wireless device, the wireless device not a part of the data processing system used for checking the status of the multiple system components; and
        recording detailed information corresponding to the component failure in an incident log,
    wherein the basic information corresponding to the component failure includes contact information for a person responsible for responding to the failure and information identifying the failed component; and
    responsive to determining that the failure was scheduled, the information corresponding to the component failure is not sent to the wireless device.

2. The method of claim 1, further comprising receiving resolution information corresponding to the component failure.

3. The method of claim 1, wherein the visual indicator includes displaying a red line indicating the failed component.

4. The method of claim 1, wherein the detailed information corresponding to the component failure includes the date that the component failed, the component identifier, the date and time the failure occurred, and the duration of the failure.

5. The method of claim 1, wherein the contact information comprises a name and a phone number for the person responsible for responding to the failure.

6. A data processing system having at least a processor and accessible memory, comprising:
    means for checking the status of multiple system components;
    means for displaying a visual indicator of a component failure;
    means for determining whether the failure was scheduled or not;
    means for displaying contact information for at least one person responsible for responding to the failure;
    means for sending, responsive to determining that the failure was not scheduled, basic information corresponding to the component failure to a wireless device, the wireless device not a part of the data processing system used for checking the status of the multiple system components; and
    means for recording detailed information corresponding to the component failure in an incident log,
    wherein the basic information corresponding to the component failure includes contact information for a person responsible for responding to the failure and information identifying the failed component, and
    wherein in response to determining that the failure was scheduled, the means for sending does not send the information corresponding to the component failure to the wireless device.

7. The data processing system of claim 6, further comprising means for receiving resolution information corresponding to the component failure.

8. The data processing system of claim 6, wherein the visual indicator includes displaying a red line indicating the failed component.

9. The data processing system of claim 6, wherein the detailed information corresponding to the component failure includes the date that the component failed, the component identifier, the date and time the failure occurred, and the duration of the failure.

10. The data processing system of claim 6, wherein the contact information comprises a name and a phone number for the person responsible for responding to the failure.

11. A non-transitory machine-readable storage medium encoded with a computer program, comprising:
   instructions for checking the status of multiple system components, using a data processing system;
   instructions for displaying a visual indicator of a component failure;
   instructions for displaying contact information for at least one person responsible for responding to the failure;
   instructions for determining whether the failure was scheduled or not;
   instructions for sending, responsive to determining that the failure was not scheduled, basic information corresponding to the component failure to a wireless device, the wireless device not a part of the data processing system used for checking the status of the multiple system components; and
   instructions for recording detailed information corresponding to the component failure in an incident log,
   wherein the basic information corresponding to the component failure includes contact information for a person responsible for responding to the failure and information identifying the failed component; and
   instructions not to send, responsive to determining that the failure was scheduled, the information corresponding to the component failure to the wireless device.

12. The non-transitory machine-readable storage medium of claim 11, further comprising instructions for receiving resolution information corresponding to the component failure.

13. The non-transitory machine-readable storage medium of claim 11, wherein the visual indicator includes displaying a red line indicating the failed component.

14. The non-transitory machine-readable storage medium of claim 11, wherein the detailed information corresponding to the component failure includes the date that the component failed, the component identifier, the date and time the failure occurred, and the duration of the failure.

15. The non-transitory machine-readable storage medium of claim 11, wherein the contact information comprises a name and a phone number for the person responsible for responding to the failure.

* * * * *